(12) United States Patent
Sakai et al.

(10) Patent No.: US 7,763,120 B2
(45) Date of Patent: Jul. 27, 2010

(54) METHOD OF PRODUCTION OF GRAIN-ORIENTED ELECTRICAL STEEL SHEET

(75) Inventors: Tatsuhiko Sakai, Futtsu (JP); Hideyuki Hamamura, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/225,963

(22) PCT Filed: Mar. 28, 2007

(86) PCT No.: PCT/JP2007/057498

§ 371 (c)(1),
(2), (4) Date: Oct. 2, 2008

(87) PCT Pub. No.: WO2007/116893

PCT Pub. Date: Oct. 18, 2007

(65) Prior Publication Data

US 2009/0114316 A1  May 7, 2009

(30) Foreign Application Priority Data

Apr. 7, 2006  (JP) .............................. 2006-106282

(51) Int. Cl.
*H01F 1/12* (2006.01)
(52) U.S. Cl. ........................... 148/112; 148/111
(58) Field of Classification Search ................ None
See application file for complete search history.

(56) References Cited

U.S. PATENT DOCUMENTS 6,666,929 B1 * 12/2003 Ban ........................... 148/111
2004/0040629 A1 * 3/2004 Hamamura et al. ......... 148/110

FOREIGN PATENT DOCUMENTS

| JP | 06-057333 | 3/1994 |
| JP | 2003-129135 | 5/2003 |
| WO | WO 2004/083465 | 9/2004 |

OTHER PUBLICATIONS

International Search Report dated Jul. 3, 2007 issued in corresponding PCT Application No. PCT/JP2007/057498.

* cited by examiner

*Primary Examiner*—John P Sheehan
(74) *Attorney, Agent, or Firm*—Kenyon & Kenyon LLP

(57) ABSTRACT

The present invention provides a method of production of grain-oriented electrical steel sheet greatly reducing the Watt loss of the grain-oriented electrical steel sheet and making the magnetostriction as small as possible, that is, a method of production of grain-oriented electrical steel sheet with small magnetostriction by improving the magnetic properties by irradiation by a finely focused laser beam comprising using a power modulated laser controlled in maximum power density to $1 \times 10^2$ to $1 \times 10^4$ W/mm$^2$ to optimize the amount of strain given by laser irradiation in both the sheet width direction and rolling direction and, in particular, to make the modulation duty 70% to less than 100%.

3 Claims, 4 Drawing Sheets

METHOD OF PRODUCTION OF GRAIN-ORIENTED ELECTRICAL STEEL SHEET

TECHNICAL FIELD

The present invention relates to a method of production of grain-oriented electrical steel sheet giving a small Watt loss and superior magnetostriction property.

BACKGROUND ART

Electrical steel sheet with axes of easy magnetization of crystals aligned in substantially the same direction in the steel sheet as a whole and high in crystal orientation is called "grain-oriented electrical steel sheet". The direction matches the rolling direction of the steel sheet. Such a steel sheet is extremely superior as the material of a transformer core.

The Watt loss when magnetizing grain-oriented electrical steel sheet by an alternating current is divided into eddy current loss and hysteresis loss. Further, the eddy current loss is divided into classical eddy current loss and abnormal eddy current loss. Classical eddy current loss is proportional to the thickness of the steel sheet, so is reduced by making the material thinner. Abnormal eddy current loss is loss due to an eddy current locally generated due to movement of the domain walls and becomes smaller proportionally to the inter-domain wall distance of the magnetic domains narrow in the rolling direction, that is, the 180° magnetic domains. Therefore, to reduce the Watt loss, various technologies for refining the magnetic domains have been invented.

It is known that by imparting linear, cyclic strain substantially vertical to the rolling direction to the surface of steel sheet, thin circulating magnetic domains are formed in their vicinities, the 180° inter-domain wall distances become narrower starting from those points, and the abnormal eddy current loss is reduced. Therefore, the method of focusing the laser beam and scanning the sheet in the width direction to impart strain has been invented and is currently being practically used.

On the other hand, hysteresis loss is loss due to the magnetization curve, that is, the hysteresis curve, and is a Watt loss component sensitive to strain of the steel sheet. Therefore, there was the problem that imparting excessive strain by firing a laser leads to an increase in the hysteresis loss.

Further, along with Watt loss, an important property of the electrical steel sheet is magnetostriction. This is due to the expansion and contraction of the steel sheet in an alternating current field and is the main cause of noise in transformer products. In particular, it is known that in electrical steel sheet with a high crystal orientation, the amount of expansion and contraction of the steel sheet has a positive correlation with the amount of strain introduced. From the viewpoint of the magnetostriction, excessive strain has to be suppressed. Accordingly, it is desirable to use as small a strain as possible to reduce the abnormal eddy current loss and greatly suppress the increase in the hysteresis loss and magnetostriction.

In conventional Watt loss reducing technology firing a laser to impart residual stress, for example, as disclosed in Japanese Patent Publication (A) No. 6-57333, the method of firing a high peak pulse laser by a short pulse of 1 to 2 μs or so in order that the peak power density on the surface of the electrical steel sheet exceeds $1 \times 10^4$ W/mm$^2$ effectively introduces strain. A high peak power Q-switch laser is being used. However, with this method, a locally extremely strong impact is given to the steel sheet, so relatively strong strain is imparted over a broader range than the focused diameter of the beam. As a result, the eddy current loss is sufficiently reduced, but the problem arises that the excessive strain causes the hysteresis loss and magnetostriction to increase.

Therefore, to introduce effective strain into a narrower region, for example, as disclosed in WO2004/083465, the rolling direction diameter of the focused spot of the laser beam is made 0.2 mm or less so as to impart strain to an extremely narrow region and obtain superior properties. With this method, compared with the high peak pulse laser, there is less occurrence of excessive strain width, but further improvement of the magnetostriction property has been desired. However, when further reducing the focused width, the power density on the electrical steel sheet surface increases, so even with a relatively low instantaneous power continuous wave laser, excessive strain enters. Further, in the case of a continuous wave laser, there is the problem that the continuous heat input process causes the steel sheet to easily melt. In this case, there was the problem that at the time of resolidification of the melted part, excessive tension occurred and rather the strain region increased. That is, in the continuous wave laser method, there were limits to the improvement of the magnetostriction property by just reducing the focused diameter.

In recent years, from the viewpoint of energy saving and environmental problems, the need for materials for high efficiency transformers, that is, high class electrical steel sheet, has been increasingly growing. In particular, due to restrictions on installation locations, the demand for reduction of transformer noise is high. Therefore, to reduce the Watt loss, technology for further improving the magnetostriction is desired.

DISCLOSURE OF THE INVENTION

The present invention provides a method of production of grain-oriented electrical steel sheet able to greatly reduce the Watt loss of grain-oriented electrical steel sheet and at the same time reduce the magnetostriction as much as possible. The means of the present invention for achieving this are as follows:

(1) A method of production of grain-oriented electrical steel sheet comprising focusing a laser beam on the surface of the grain-oriented electrical steel sheet and scanning the surface of the grain-oriented electrical steel sheet by it in the sheet width direction to cyclically impart residual stress and improve the magnetic properties, said method characterized in that, the laser beam is a beam obtained by cyclically power modulating a continuous wave laser, when using the modulation period Tm, the time frame Tf where the power is 10% or less of the maximum value Pp, and the difference between this modulation period Tm and time frame Tf (Tn=Tm−Tf) to define the power modulation duty Dp as Dp=Tn/Tm×100(%) in the time waveform of said power modulated beam, the power modulation duty Dp is 70% to less than 100%, and the minimum value Pb of power of said laser beam is 10% or less of the maximum value Pp.

(2) A method of production of grain-oriented electrical steel sheet as set forth in (1) characterized in that, when defining a peak power density Ppd of said laser beam on the surface of the steel sheet by a focus area S of said laser beam and said maximum value Pp as Ppd=Pp/S, the peak power density Ppd is $1 \times 10^2$ to $1 \times 10^4$ (W/mm$^2$).

(3) A method of production of grain-oriented electrical steel sheet as set forth in (1) or (2) characterized in that said the laser beam is a beam emitted from a semiconductor laser excited fiber laser apparatus.

BEST MODE FOR CARRYING OUT THE INVENTION

Circulating magnetic domains are formed in a region given strain by lasering. Expansion and contraction of the circulating magnetic domains lead to magnetostriction, so the amount of strain introduced has a substantially positive correlation with the magnetostriction. Accordingly, to keep the increase in magnetostriction to the minimum, it is ideal to impart sufficient strain to reduce the eddy current loss and not to give any unnecessary strain over that. That is, it is important to optimize the introduced strain volume.

Figure 5:
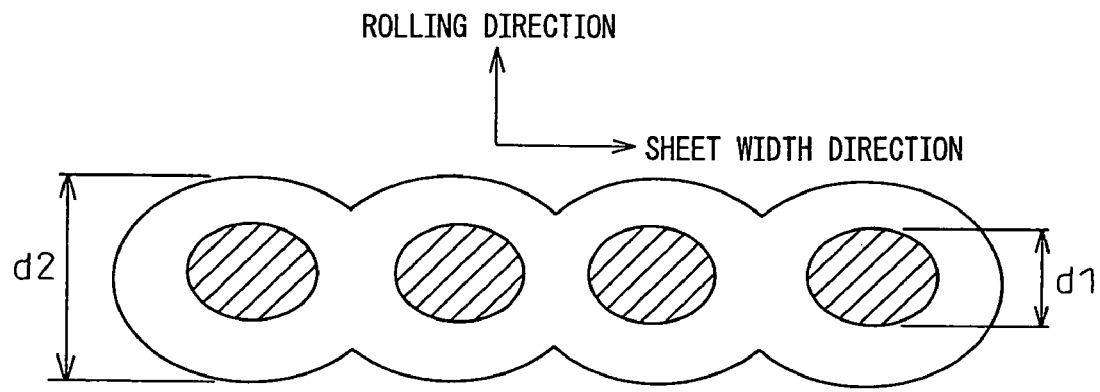
FIG. 5 is a schematic view of the focused diameter and the strain width in firing of a high peak pulse laser.

In a pulsed laser such as a Q-switch $CO_2$ laser or YAG laser, the energy built up in the laser medium is taken out in an instant as a laser beam, so the pulse energy at a pulse width of several μs or less is high and the peak power easily exceeds several kW. With firing by such a pulse laser with a short pulse high peak, the strain is effectively introduced, but as shown in FIG. 5, an extremely strong impact force causes strain of a width d2 in a wide range around the focused beam diameter d1 whereby excessive strain tends to be introduced. For this reason, reduction and control of the volume in which strain is introduced are difficult. As disclosed in Patent Document 1, it is believed that such a phenomenon occurs with a high peak power density such as one over $1 \times 10^4$ W/mm$^2$.

Figure 6:
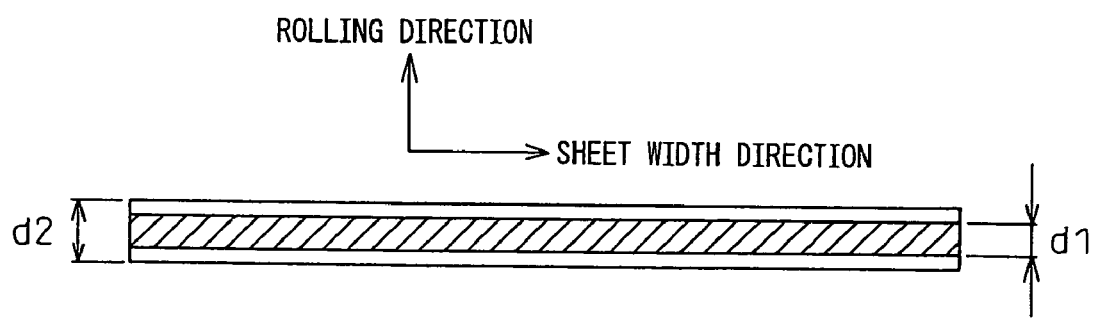
FIG. 6 is a schematic view of the focused diameter and the strain width in firing of a continuous wave laser.

On the other hand, with a continuous wave laser, the instantaneous power density is small. As shown in FIG. 6, the strain width d2 produced becomes substantially equal to the beam focused diameter d1. Therefore, by controlling the focused diameter, it is possible to control the strain width d2 in the rolling direction to a certain extent. However, the sheet width direction becomes a continuous, uniform strain distribution, so the freedom of control other than of the rolling direction width is limited.

The inventors postulated that even if keeping the strain width in the rolling direction to the minimum limit by a continuous wave laser, the Watt loss could be sufficiently improved without continuously introducing strain over the entire sheet width direction. That is, they thought that there is excessive strain unnecessarily increasing the magnetostriction in the sheet width direction. Therefore, to control the strain distribution in the sheet width direction and control and optimize the strain volume, they arrived at the invention of suppressing the power density and modulating the power by time based on a finely focused continuous wave laser so as to cyclically form parts where strain is introduced in the sheet width direction and parts where it is not.

Below, embodiments will be used to explain a mode of carrying out the present invention.

Figure 1:
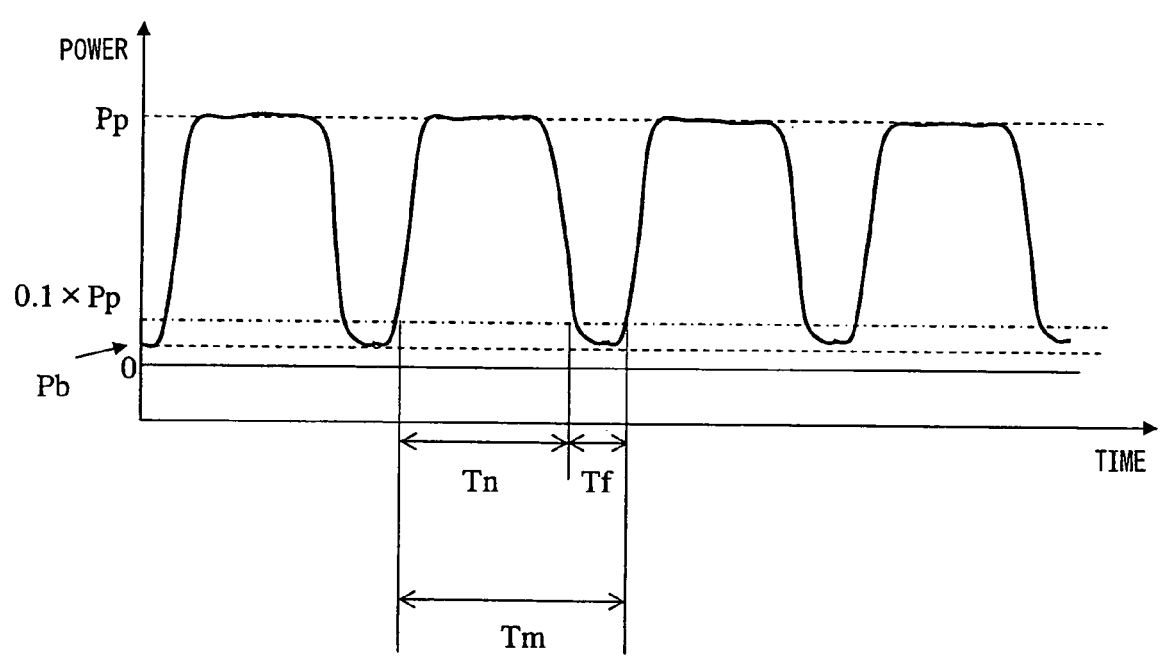
FIG. 1 is a view explaining modulation of laser power in a method of production of grain-oriented electrical steel sheet superior in magnetic properties of the present invention.

FIG. 1 is an example of the power modulation waveform of a continuous wave laser of the present invention. The maximum power is the maximum output Pp of the continuous wave laser and cyclically has a low power time region having the minimum value Pb by the power modulation. When the modulation period is Tm, the time frame when the power is 10% or less of the maximum value is Tf, and Tm−Tf is made Tn, the power modulation duty Dp is defined as Dp=Tn/Tm× 100(%). Further, the modulation frequency is Fm=1/Tm.

Figure 2:
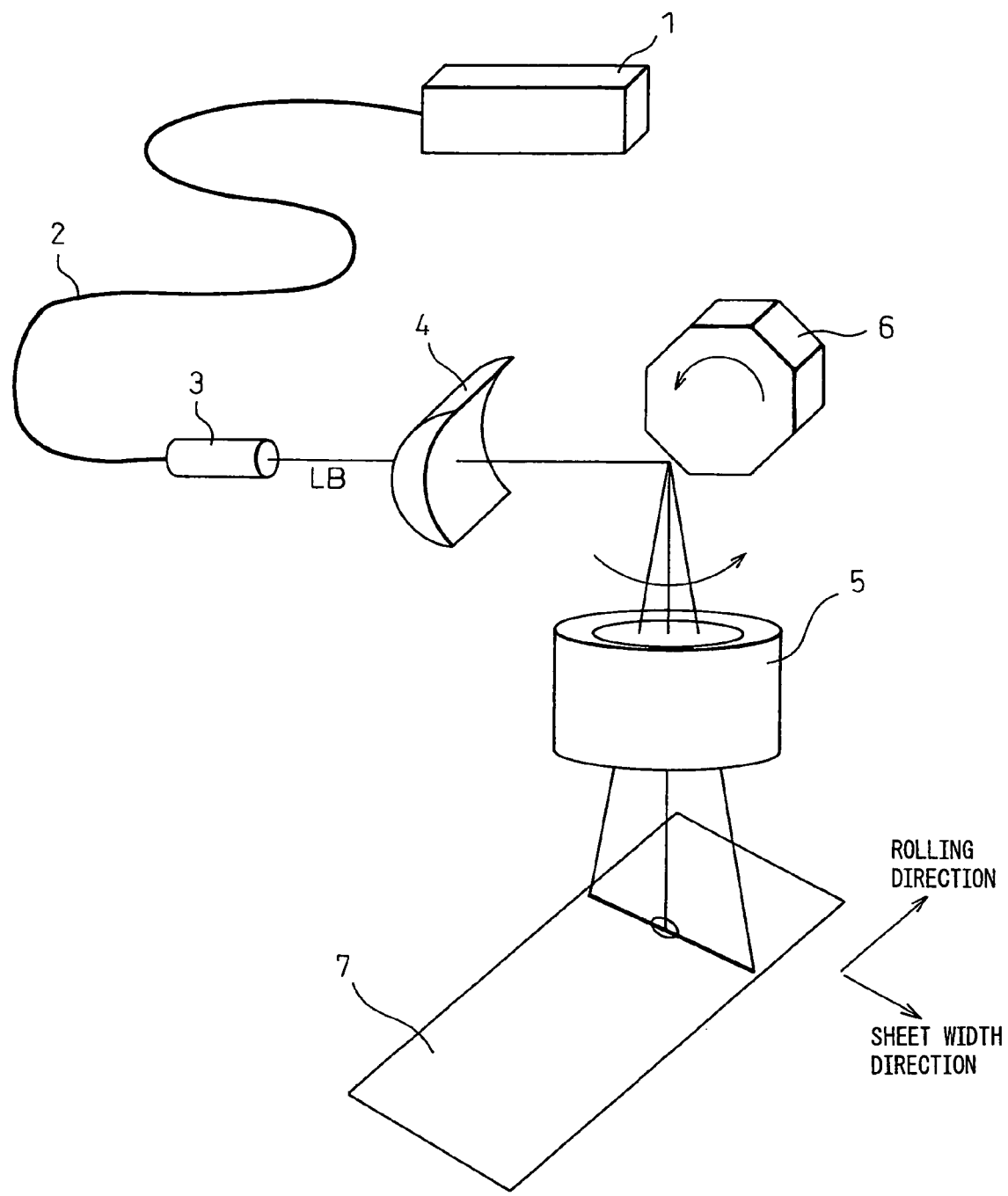
FIG. 2 is an explanatory view of an embodiment of a method of production of grain-oriented electrical steel sheet superior in magnetic properties of the present invention.

FIG. 2 is a schematic view of a laser experiment in an embodiment of the present invention. The laser apparatus 1 is a semiconductor laser excited fiber laser. The excitation light source, that is, the semiconductor laser, can be modulated at a high speed, so the output of the fiber laser also is modulated at a high speed. The fiber laser has a fiber core diameter of 10 μm. It is possible to focus it up to the core diameter suitably using a focusing optical system. The laser wavelength is 1.07 μm. The laser output passes through the transmission fiber 2 and is output by the output head 3. The laser beam LB is focused by a combination of a cylindrical lens 4 and an fθ lens 5.

In this embodiment, the maximum power Pp is 100 W, and the focus beam is an ellipse with a rolling direction diameter d1=100 μm and a sheet width direction diameter dc=300 μm. Therefore, the maximum power density Ppd is $0.4 \times 10^4$ W/mm$^2$. The laser beam is made to scan the sheet width direction at a velocity Vs by a polygonal mirror 6. In this embodiment, Vs=15 m/s. Further, by movement of the steel sheet 7 in the rolling direction, the pitch Pl of irradiation in the rolling direction was made 6 mm. Under these conditions, the inventors fixed the modulation frequency Fm to 2 kHz and changed the pulse modulation duty Dp in various ways to investigate the Watt loss and magnetostriction property.

Figure 3:
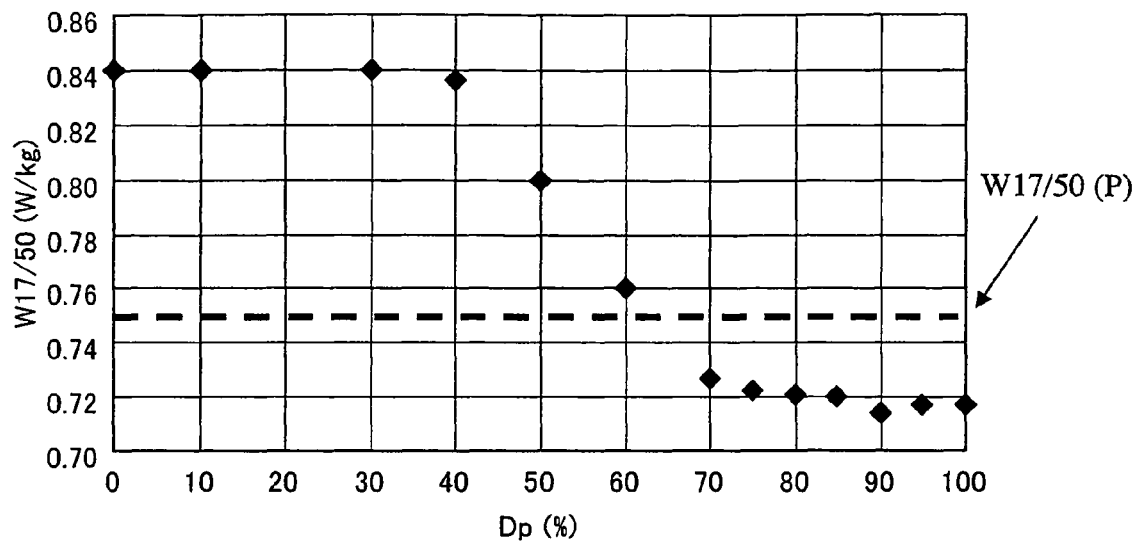
FIG. 3 is a view explaining the relationship between the modulation duty and Watt loss of an embodiment.

FIG. 3 shows the relationship between the pulse modulation duty Dp and the Watt loss W17/50 after laser irradiation when using as the sample a material having a sheet thickness of 0.23 mm, a magnetic flux density B8 of 1.935 T, and a Watt loss W17/50 before laser irradiation of 084 W/kg. The sample size is a width of 60 mm and length in the rolling direction of 300 mm.

B8 is the magnetic flux density of a steel sheet occurring at a magnetization force of 800 A/m. W17/50 is the Watt loss at the alternating current excitation frequency of 50 Hz and a maximum magnetic flux density of 1.7 T.

Figure 4:
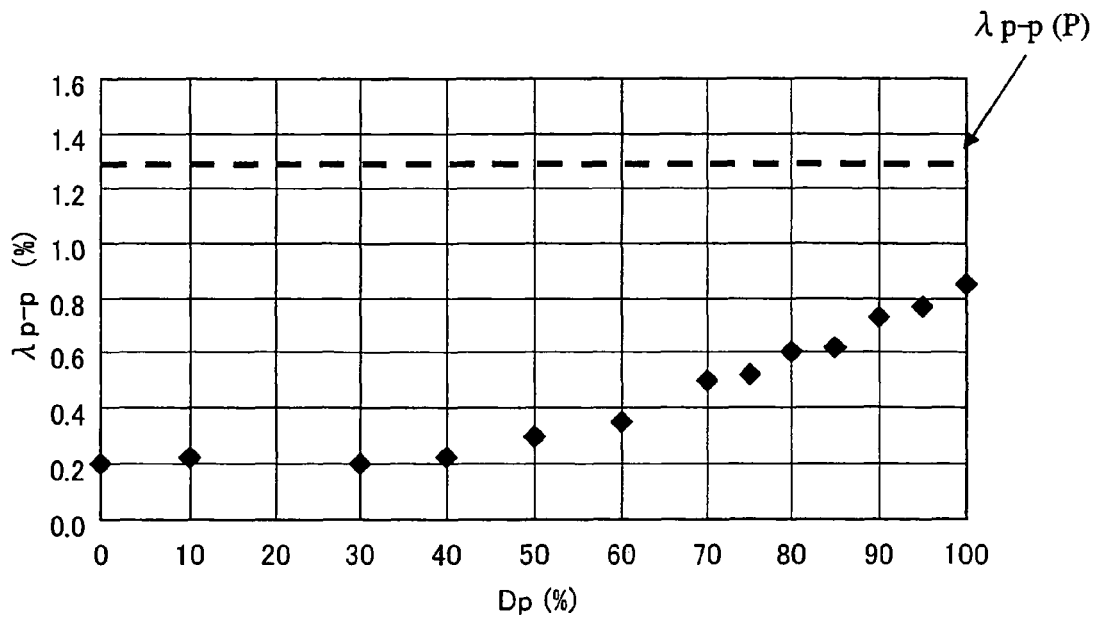
FIG. 4 is a view explaining the relationship between the modulation duty and magnetostriction of an embodiment.

Further, FIG. 4 shows the relationship of the magnetostriction λp-p and the pulse modulation duty Dp. Here, λp-p is the ratio (%) of the total expansion or contraction of the steel sheet in the rolling direction to the length of the steel sheet at an alternating current excitation frequency of 50 Hz and a maximum magnetic flux density of 1.7 T.

Note that as a comparison, the inventors investigated the Watt loss and magnetostriction in the case of irradiating the same sample with a Q-switch pulse $CO_2$ laser with a wavelength of 10.6 μm. The firing conditions were a focused beam diameter in the rolling direction of 0.3 mm, a focused diameter in the sheet width direction of 0.5 mm, a pulse time frame of 2 μs, a pulse frequency of 20 kHz, a pulse energy of 6 mJ, an average power of 120 W, a beam scan velocity Vs of 10 m/s, and an irradiation pitch Pl of 6 mm. The Q-switch $CO_2$ laser pulse has a sharp peak at the start of the pulse, the peak power Pp is 2 kW, and the maximum power density Ppd is $1.7 \times 10^4$ W/mm$^2$.

From FIG. 3, from the pulse modulation duty Dp=100%, corresponding to complete continuous wave laser irradiation, to Dp=70%, the Watt loss exhibits a low level of W17/50=0.70 W/kg or so. As shown by the broken line in FIG. 3, a Watt loss lower than the Watt loss W17/50(P)=0.750 W/kg of the Q-switch $CO_2$ pulse laser method was obtained. The reason why the Watt loss cannot be sufficiently reduced with a Q-switch pulse laser is that while the eddy current loss is reduced, the strain volume becomes excessive and the increase in hysteresis loss becomes remarkable.

On the other hand, in FIG. 4, a tendency is seen where the magnetostriction decreases substantially monotonously along with a decrease in the pulse modulation duty Dp. That is, it is believed that by modulating the continuous wave laser by power to create a time region of 10% or less of the maximum power, in that time region, almost no strain will be introduced into the steel sheet. As a result, along with the reduction of the Dp, the amount of strain introduced is reduced.

From the results of FIG. 3, the Watt loss reducing effect is substantially satisfied at a pulse modulation duty Dp of 70%. Even if increasing Dp over this, the Watt loss will not fall beyond this. On the other hand, from the results of FIG. 4, even if increasing the Dp to 70% or more and introducing strain, the magnetostriction is increased unnecessarily.

Note that with the Q-switch $CO_2$ laser method, due to the short pulse, high peak power, the strain region tends to become wider. Furthermore, the wavelength is a long 10 times or more of the fiber laser, so there are limits to reduction of the focused diameter. Accordingly, the strain width is greater than with the fiber laser of the present invention. Therefore, as shown by the broken line in FIG. 4, the magnetostriction $\lambda$p-p(P) by the pulse laser method is larger than the case of the present invention.

Therefore, in the method of firing a power modulated laser finely focused and suppressed in power density according to the present invention, compared with the conventional high peak pulse laser method, properties superior in both Watt loss and magnetostriction are obtained. Further, even compared with the continuous wave laser method suppressing the maximum power density, an equal Watt loss and low magnetostriction are obtained. In particular, a lower magnetostriction and low Watt loss are obtained in the range of a pulse modulation duty Dp of 70% to less than 100%.

In the present invention, controlling the strain region is important. If the power density Ppd exceeds $1\times10^4$ $W/mm^2$, as explained above, excessive strain of over the focused diameter is introduced, so this is not preferred. On the other hand, the value of the minimum power density Ppd enabling the formation of strain where the Watt loss reducing effect becomes sufficient depends on the laser beam scan velocity on the surface of the electrical steel sheet. The value of the minimum power density Ppd can be found by firing a laser at a pulse modulation duty Dp of 100%, that is, completely continuously. From the viewpoint of the productivity in the production process as in the above embodiment, in the range of laser beam scan velocity in a scan optical system able to be worked without unreasonable effort, the lower limit of the power density Ppd is $1\times10^2$ $W/mm^2$. When smaller than this, almost no strain occurs, so the Watt loss reducing effect is also greatly reduced. Therefore, the range of the power density Ppd is preferably a range from $1\times10^2$ to $1\times10^4$ $W/mm^2$.

To achieve the object of the present invention, it is necessary to perform predetermined power modulation at a high precision. A semiconductor laser enables high speed modulation by control of the current, so a fiber laser using this as an excitation source can be controlled in modulation at the same fast speed. Further, the fiber laser enables easy focusing to a level equal to the core diameter, so to prevent excessive strain width from being imparted, the focused diameter can be made finer. Therefore, to carry out the present invention, a semiconductor laser excited fiber laser is suitable.

Further, from the viewpoint of the wavelength, a shorter wavelength enables a finer focus. On the other hand, a longer wavelength enables a high rate of absorption of laser energy by the electrical steel sheet. A wavelength 1.07 to 2.10 μm fiber laser positioned between a YAG laser of a wavelength of 1.06 μm and a $CO_2$ laser of a wavelength of 10.6 μm among the practical lasers is preferable.

INDUSTRIAL APPLICABILITY

According to the present invention, control of the amount of strain introduced by lasering becomes possible in both the rolling direction and the sheet width direction, the Watt loss can be minimized, and the amount of strain for suppressing the increase in magnetostriction can be optimized, so grain-oriented electrical steel sheet with an extremely small Watt loss and superior magnetostriction property can be produced as a material for a high efficiency, low noise transformer.

LIST OF REFERENCES

1 fiber laser apparatus
2 transmission fiber
3 laser output head
4 cylindrical lens
5 fθ lens
6 polygonal mirror
7 electrical steel sheet
Pp maximum power
Pb minimum power
Ppd spatial maximum power density
Tm modulation period
Tf time frame where power is 10% or less of maximum value
Tn Tm−Tf
Dp power modulation duty
LB laser beam
d1 beam focused diameter
d2 strain width
W17/50 Watt loss
$\lambda$p-p magnetostriction
W17/50(P) peak Watt loss after irradiation by laser by Q-switch pulse laser method
$\lambda$p-p(P) magnetostriction after irradiation by laser by Q-switch pulse laser method

The invention claimed is:

1. A method of improving magnetic properties of a grain-oriented electrical steel sheet, comprising focusing a laser beam on the surface of the grain-oriented electrical steel sheet and irradiating the surface of the grain-oriented electrical steel sheet by said laser beam in a sheet width direction to cyclically impart residual stress, said method characterized in that, the laser beam is a power modulated beam obtained by cyclically power modulating a continuous wave laser, said power modulated beam having a power modulation duty Dp of 70% to less than 100%, wherein Dp is defined as Dp=Tn/Tm×100(%), Tm is a modulation period, Tn is defined as Tn=Tm−Tf, and Tf is a time period in which the power of said power modulated beam is 10% or less of a maximum value Pp, and wherein a minimum value Pb of power of said power modulated laser beam is 10% or less of the maximum value Pp.

2. A method of improving magnetic properties of a grain-oriented electrical steel sheet as set forth in claim 1, characterized in that said power modulated beam has a peak power density Ppd on the surface of the steel sheet of $1\times10^2$ to $1\times10^4$ (W/mm$^2$), wherein said peak power density Ppd of said power modulated beam is defined as Ppd=Pp/S, wherein S is a focus area of said laser beam on the surface of the steel sheet.

3. A method of improving magnetic properties of a grain-oriented electrical steel sheet as set forth in claim 1, characterized in that said laser beam is a beam emitted from a semiconductor laser excited fiber laser apparatus.

* * * * *